Patented Dec. 19, 1922.

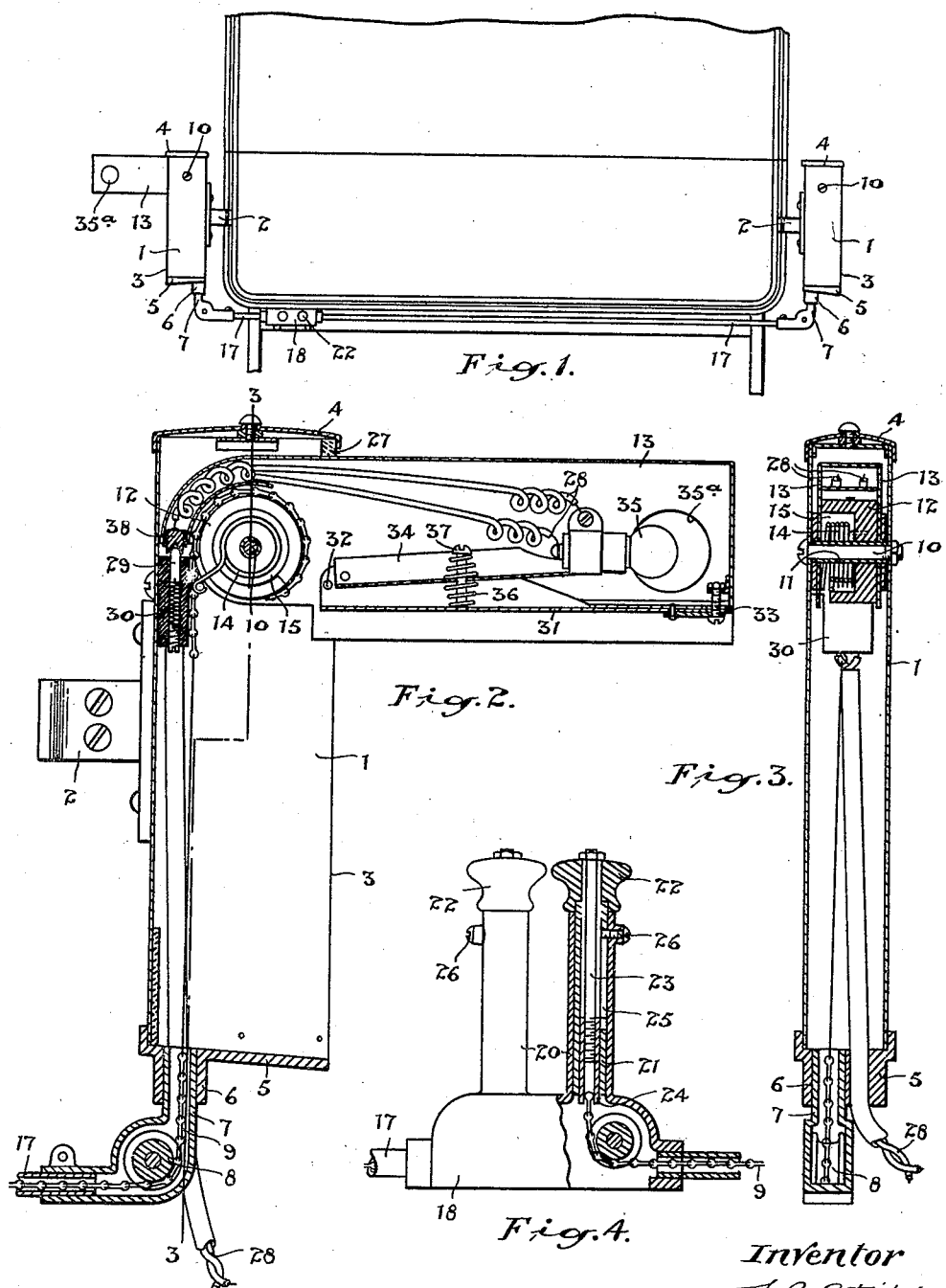

1,439,598

UNITED STATES PATENT OFFICE.

HENRY R. ASTRIDGE, OF TORONTO, ONTARIO, CANADA.

TRAFFIC SIGNAL.

Application filed May 20, 1920. Serial No. 382,917.

*To all whom it may concern:*

Be it known that I, HENRY R. ASTRIDGE, a subject of the King of Great Britain, and resident of the city of Toronto, county of York, Province of Ontario, in the Dominion of Canada, have invented certain new and useful Improvements in Traffic Signals, described in the following specification and illustrated in the accompanying drawings, that form part of the same.

The principal objects of the invention are, to eliminate the difficulties and dangers incident to operating vehicles in heavy traffic, and to devise a simple and effective device for giving warning of the intended change of direction of a vehicle.

The principal features of the invention consist in the novel construction and arrangement of parts, whereby a semaphore is operated to extend from either side of the vehicle by flexible connections and returned to its normal concealed position by spring means, and whereby signal lamps are operated directly by the mechanical operation of the semaphores.

In the drawings, Figure 1 is an elevational view showing my improved device attached to a windshield.

Figure 2 is an enlarged longitudinal sectional view of one of the signal devices showing the semaphore extended.

Figure 3 is a vertical sectional view through the line 3—3 of Figure 1.

Figure 4 is an enlarged elevational part sectional view of the members for operating the semaphores.

My improved signal apparatus consists of a pair of casings 1 each of which is provided with a fastening bracket 2 on one side, which bracket is secured to the vertical sides of the windshield frame.

The casings are each of rectangular form and are preferably constructed of sheet metal having one of the longitudinal sides 3 open.

A cap 4 covers the top and the cast metal base 5 closes the bottom. The bottom is sloped downwardly toward the open side 3 to allow rain or any moisture collecting therein to drain out.

At the inward side of the bottom there is formed a boss 6 in which is secured a tubular member 7 which is of right angular construction and supports a grooved pulley 8 in the angle around which the semaphore operating chain 9 extends. Adjacent to the top of the casing and intermediate of its width is arranged a bolt 10. Upon this bolt is mounted a sleeve 11 which carries a spool
12 around the periphery of which the operating chain 9 is secured.

A semaphore arm is formed of sheet metal having the sides 13 extending each side of the spool 12 and secured thereto.

A coil compression spring 14 is arranged within a recess 15 in one end of the spool 12 and one end of said spring is connected with the spool and the other to a rigid pin secured in the side of the casing. The spring exerts a rotative action upon the spool to throw the semaphore downwardly when the pull upon the chain 9 is released.

Tubes 17 connect the inward ends of the tubular members 7 of each of the semaphore casings and to these tubes is secured a casing 18 which is arranged in a suitable position convenient to the driver.

Within the casing 18 are secured a pair of grooved pulleys around which the operating chain 9 extends and tangentially opposite the said pulleys and at right angles to the tubes 17 are arranged a pair of tubular members 20 within which are slidably arranged the tubular members 21.

The members 21 have knobs 22 secured to the outer end and extending inwardly from these knobs are long screws 23 upon the inner ends of which are threaded the sleeves 24 secured to the chains 9. Any slack in the chains can be taken up by turning the screws 23 to adjust the sleeve 24. The tubular members 21 are each provided with longitudinal bayonet slots 25 which engage the screws 26 secured in the side walls of the members 20 so that when the members are pulled outwardly a slight turn will enter the screws 26 into the offset end of the bayonet slot and hold the member extended. The operation of either of the tubular members 21 pulls upon the chain 9 and throws the semaphore upwardly and outwardly to extend from the casing thereby signalling to the traffic the intended direction of travel.

The semaphore may be held in an extended position by the turning of the knob 22 to engage the transverse portion of the bayonet slot with the screw 26 but when released the coil spring 14 throws the semaphore downwardly. The upper and inner end of the semaphore is curved concentric with the bolt 10 and swings freely within the upper end of the casing.

A felt or rubber cushion 27 extends across the top of the open front side of the casing against which the semaphore strikes when raised.

In all devices of this class it is essential that lighting means be provided for night service and in order to provide for proper lighting, electric wires 28 are carried to the interior of the casing 1 and connected to a pair of spring terminals 29 arranged in an insulating block 30, immediately behind the upper end of the semaphore. The semaphore itself is provided with a bottom 31 which is pivotally supported by rivets 32 in the sides and secured by a fastener 33 at the front end so that by loosening the fastener the bottom may be swung outwardly.

Supported between the sides of the swinging bottom is a pivotal arm 34 and upon the inner end of this arm is supported the signal lamp 35. Openings 35ª are arranged in both sides of the casing opposite the lamp, said openings having suitable colored glass arranged therein. The arm 34 is supported intermediate of its length by a double coil spring 36 encircling a screw 37. The screw extends loosely through the arm and the spring is arranged above and below so that all jolting will be relieved and the lamp be thus protected. The wires from the lamp extend rearwardly in the semaphore to contact blocks 38 which are adapted to be brought into engagement with the spring terminals 29 when the semaphore is raised. The lamp is thus automatically lighted when the semaphore arm is thrown to its raised position.

The construction of this signal apparatus is very simple. It is extremely positive in its operation and provides a first class signal which may be readily attached to any vehicle.

What I claim as my invention is:—

1. A traffic signal for automobiles, comprising, a rectangular shaped casing having an open side, a rectangular shaped semaphore enclosed within said casing, a spool member arranged within the upper end of said semaphore and having a recess in one end, a pivot bolt extending through said spool and secured in the sides of the casing and forming the pivot support for the semaphore, a coil spring arranged within the recess of said spool and having one end secured thereto and the other end rigidly secured to the casing, a flexible cord secured to the periphery of said spool extending over the top and downwardly to the bottom of the casing, and means for pulling upon said flexible cord to swing said semaphore upon its pivot.

2. A traffic signal for automobiles, comprising a casing adapted to be secured in a vertical position from the frame of the automobile and having an open side, a semaphore pivoted within said casing and adapted to swing outwardly, a flexible member connected to said semaphore, a tubular member secured to the bottom of the casing and having a pulley arranged therein around which said cord is adapted to pass, a tube connected to said tubular member, a casing connected to said tube having a laterally extending tubular portion, a member slidably arranged in the tublar portion of said casing and connected with the flexible cord for operating the semaphore.

3. A traffic signal for automobiles, comprising, a vertically arranged casing having an open side, a semaphore pivotally mounted at the top within said casing, means for swinging said semaphore on its pivot upwardly, spring means for returning said semaphore to its lower position, a pivotal member closing the underside of the semaphore, an arm pivotally mounted on said pivotal member and carrying a lamp, a bolt secured to said pivotal closing member and extending through said arm, and springs arranged either side of said pivotal arm and encircling said bolt.

HENRY R. ASTRIDGE.